US011761273B2

(12) United States Patent
 Zheng

(10) Patent No.: US 11,761,273 B2
(45) Date of Patent: Sep. 19, 2023

(54) DETERMINING STICKUP HEIGHT BASED ON PIPE TALLY, BLOCK POSITION, AND DIGITAL IMAGES

(71) Applicant: Schlumberger Technology Corporation, Sugar Land, TX (US)

(72) Inventor: Shunfeng Zheng, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 81 days.

(21) Appl. No.: 17/199,994

(22) Filed: Mar. 12, 2021

(65) Prior Publication Data

US 2022/0290513 A1    Sep. 15, 2022

(51) Int. Cl.
*G06K 9/00* (2022.01)
*E21B 19/16* (2006.01)
(Continued)

(52) U.S. Cl.
CPC .............. *E21B 19/165* (2013.01); *G06T 7/73* (2017.01); *G06V 10/40* (2022.01); *G06V 20/20* (2022.01);
(Continued)

(58) Field of Classification Search
CPC . G06T 7/73; G06T 2207/30108; G06V 10/40; G06V 20/20; G06V 2201/06
See application file for complete search history.

(56) References Cited

U.S. PATENT DOCUMENTS 2,460,481 A * 2/1949 Abel ........................ E21B 37/02
166/187
5,107,705 A * 4/1992 Wraight .................. E21B 45/00
702/9
(Continued)

FOREIGN PATENT DOCUMENTS

WO   WO-2011135311 A2 * 11/2011 ............. B66C 13/02
WO   WO-2012058435 A2 *  5/2012 ............. E21B 44/00
(Continued)

OTHER PUBLICATIONS

Analysis of Segmentation and Identification of Square-Hexa-Round-Holed Nuts Using Sobel and Canny Edge Detector, Dayanand G Savakar et al., Springer, 2019, pp. 271-283 (Year: 2019).*
(Continued)

*Primary Examiner* — Jayesh A Patel
(74) *Attorney, Agent, or Firm* — Kelly McKinney

(57) ABSTRACT

A monitoring system for determining a stickup height of a drill string. The monitoring system includes a video camera operable to facilitate a digital image, a block position sensor operable to facilitate block position measurements, and/or a processing device. The processing device receives the digital image, recognizes an upper end of the drill string or a connection joint of the drill string on the digital image, and determines the stickup height based on location of the upper end of the drill string or the connection joint of the drill string on the digital image. The processing device may also or instead record a pipe tally indicative of a length of each drill pipe and a location of each drill pipe within the drill string, receive the block position measurements, and determine the stickup height based on the pipe tally and block position measurements.

19 Claims, 3 Drawing Sheets

(51) Int. Cl.
*G06V 20/20* (2022.01)
*G06T 7/73* (2017.01)
*G06V 10/40* (2022.01)

(52) U.S. Cl.
CPC ............... *G06T 2207/30108* (2013.01); *G06V 2201/06* (2022.01)

(56) References Cited

U.S. PATENT DOCUMENTS

| | | | |
|---|---|---|---|
| 11,131,540 B2* | 9/2021 | Orban | G01B 11/02 |
| 11,585,932 B2* | 2/2023 | Blakely | E21B 19/161 |
| 2002/0129941 A1* | 9/2002 | Alves | E21B 37/06 |
| | | | 166/70 |
| 2006/0054326 A1* | 3/2006 | Alves | E21B 33/068 |
| | | | 166/310 |
| 2012/0273230 A1* | 11/2012 | Patterson | E21B 19/165 |
| | | | 166/77.51 |
| 2013/0275100 A1* | 10/2013 | Ellis | E21B 19/20 |
| | | | 703/2 |
| 2014/0076548 A1* | 3/2014 | Patterson | E21B 19/165 |
| | | | 166/250.01 |
| 2014/0079286 A1* | 3/2014 | Lee | G06V 10/758 |
| | | | 382/103 |
| 2014/0233804 A1 | 8/2014 | Gustavsson et al. | |
| 2018/0128093 A1* | 5/2018 | Jeffryes | G05B 19/4163 |
| 2018/0216424 A1* | 8/2018 | Pilgrim | E21B 19/161 |
| 2019/0078426 A1* | 3/2019 | Zheng | E21B 21/08 |
| 2019/0136650 A1* | 5/2019 | Zheng | E21B 44/00 |
| 2019/0163975 A1* | 5/2019 | Desai | G06F 16/5838 |
| 2019/0385298 A1* | 12/2019 | Torrione | E21B 17/006 |
| 2020/0157893 A1* | 5/2020 | Jorud | E21B 19/165 |
| 2020/0200930 A1* | 6/2020 | Parmeshwar | G01V 13/00 |
| 2020/0224523 A1* | 7/2020 | Parmeshwar | E21B 19/165 |
| 2020/0224526 A1* | 7/2020 | Parmeshwar | E21B 47/024 |
| 2020/0278193 A1* | 9/2020 | Orban | E21B 47/08 |
| 2020/0325764 A1* | 10/2020 | Ruehmann | G06T 7/001 |
| 2020/0326226 A1* | 10/2020 | Camacho Cardenas | |
| | | | E21B 19/00 |
| 2021/0115742 A1* | 4/2021 | Agarwal | G01D 5/14 |
| 2021/0156209 A1* | 5/2021 | Magnuson | G06T 7/001 |
| 2021/0254453 A1* | 8/2021 | Tran | E21B 19/08 |
| 2021/0277732 A1* | 9/2021 | Parmeshwar | E21B 19/166 |
| 2021/0355765 A1* | 11/2021 | Ruehmann | G06T 7/0004 |
| 2021/0358136 A1* | 11/2021 | Sachtleben | G06T 7/269 |
| 2022/0025759 A1* | 1/2022 | Magana-Mora | E21B 19/165 |
| 2022/0127932 A1* | 4/2022 | Yepez | G01B 21/18 |
| 2022/0154570 A1* | 5/2022 | Mehta | E21B 49/003 |
| 2022/0179120 A1* | 6/2022 | Zheng | E21B 19/165 |

FOREIGN PATENT DOCUMENTS

| | | | | |
|---|---|---|---|---|
| WO | WO-2013048260 A2 * | 4/2013 | | E21B 19/165 |
| WO | WO-2017132297 A2 * | 8/2017 | | E21B 17/006 |
| WO | WO-2017210033 A1 * | 12/2017 | | E21B 19/00 |
| WO | WO-2020150345 A1 * | 7/2020 | | E21B 19/165 |
| WO | WO-2020172144 A1 | 8/2020 | | |
| WO | WO-2021026632 A1 * | 2/2021 | | E21B 19/165 |

OTHER PUBLICATIONS

Shape Measures for Content Based Image Retrieval: a Comparison, Babu M Mehtre et al., Pergamon, 1997, pp. 319-337 (Year: 1997).*
Tripping operations—Vision Technology, Y. S. Vintervold et al., IADC, 2017, pp. 1-17 (Year: 2017).*
Vintervold, Y.S., et al, "Tripping Operations Optimized Through Closed-Loop Vision Technology", SPE/IADC Drilling Conference and Exhibition, SPE/IADC 184664, 2017, 17 pages.

* cited by examiner

DETERMINING STICKUP HEIGHT BASED ON PIPE TALLY, BLOCK POSITION, AND DIGITAL IMAGES

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (i.e., a drilling rig) having various surface and subterranean well construction equipment being operated in a coordinated manner. For example, a surface driver (e.g., a top drive and/or a rotary table) and/or a downhole mud motor can be utilized to rotate and advance a drill string into a subterranean formation to drill a wellbore. The drill string may include a plurality of drill pipes coupled together and terminating with a drill bit. Length of the drill string may be increased by connecting additional drill pipes to the drill string while depth of the wellbore increases. Drilling fluid may be pumped from the wellsite surface down through the drill string to the drill bit. The drilling fluid lubricates and cools the drill bit and carries drill cuttings from the wellbore back to the wellsite surface. The drilling fluid returning to the surface may then be cleaned and again pumped through the drill string. The well construction equipment may be monitored and controlled by corresponding local controllers and/or a remotely located central controller. Some of the well construction operations performed by the well construction equipment may also or instead be monitored and controlled manually by a rig personnel (e.g., a driller) via a control workstation located within a control center.

Automating connection and disconnection of drill pipes to and from the drill string relies on accurate measurements of stickup height of the drill string. When a measurement of stickup height is inaccurate, a driller has to manually adjust height of an iron roughneck before the iron roughneck can connect or disconnect (i.e., make up or break out) a drill pipe to or from the drill string. The manual adjustment introduces a delay to the well construction operations (e.g., drilling, tripping, etc.).

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a monitoring system for determining a stickup height of a drill string for drilling a wellbore. The drill string includes multiple drill pipes assembled via equipment of a drill rig. The monitoring system includes a block position sensor and a processing device. The block position sensor facilitates block position measurements indicative of a position of a travelling block of a hoisting system. The processing device includes a processor and a memory storing a computer program code. The processing device records a pipe tally indicative of a length of each drill pipe of the drill string and a location of each drill pipe within the drill string, receives the block position measurements while the hoisting system moves the drill string, and determines the stickup height based on the pipe tally and the block position measurements.

The present disclosure also introduces an apparatus including a monitoring system for determining a stickup height of a drill string for drilling a wellbore. The drill string includes multiple drill pipes assembled via equipment of a drill rig. The monitoring system includes a video camera and a processing device. The video camera facilitates a digital image containing an upper end of the drill string or a connection joint of the drill string. The processing device includes a processor and a memory storing a computer program code. The processing device receives the digital image, recognizes the upper end of the drill string or the connection joint of the drill string on the digital image based on other images containing upper ends of other drill strings and connection joints of other drill strings recorded in an image database, and determines the stickup height based at least in part on location of the upper end of the drill string or the connection joint of the drill string on the digital image.

The present disclosure also introduces an apparatus including a monitoring system for determining a stickup height of a drill string for drilling a wellbore. The drill string includes multiple drill pipes assembled via equipment of a drill rig. The monitoring system includes multiple video cameras and a processing device. The video cameras each facilitate a digital image containing an upper end of the drill string or a connection joint of the drill string. The processing device includes a processor and a memory storing a computer program code. The processing device receives the digital images facilitated by the cameras, recognizes the upper end of the drill string or the connection joint of the drill string on each digital image, determines a confidence level of recognition of the upper end of the drill string or the connection joint of the drill string for each digital image, determines the stickup height based on one or more of the digital images associated with a highest confidence level of recognition, and outputs the determined stickup height to a control device for controlling an iron roughneck such that the control device can position the iron roughneck at a height that permits the iron roughneck to perform make up or break out operations.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
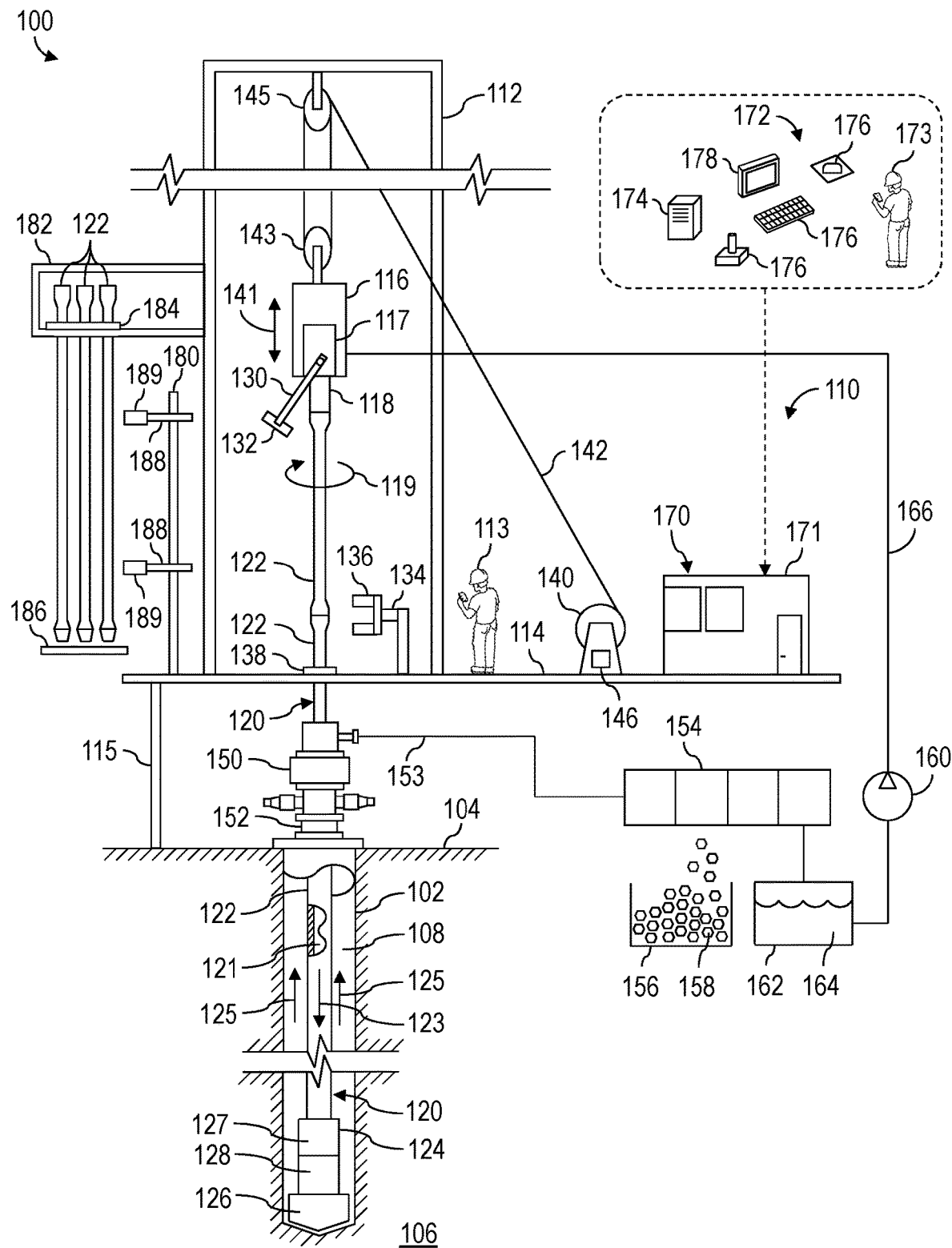
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods (e.g., processes, operations, etc.) according to one or more aspects of the present disclosure may be used or performed in association with a well construction system at a wellsite, such as for constructing a wellbore to obtain hydrocarbons (e.g., oil and/or gas) or other natural resources from a subterranean formation. A person having ordinary skill in the art will readily understand that one or more aspects of systems and methods disclosed herein may be utilized in other industries and/or in association with other systems.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction rig (i.e., a drilling rig) and associated equipment collectively operable to construct (e.g., drill) a wellbore 102 extending from a wellsite surface 104 into a subterranean formation 106 via rotary and/or directional drilling. Although the well construction system 100 is depicted as an onshore implementation, the aspects described below are also applicable or readily adaptable to offshore implementations.

The well construction system 100 comprises well construction equipment, such as surface equipment 110 located at the wellsite surface 104 and a drill string 120 suspended within the wellbore 102. The surface equipment 110 may include a support structure 112 (e.g., a mast or derrick) disposed over a rig floor 114. The drill string 120 may be suspended within the wellbore 102 from the support structure 112. The support structure 112 and the rig floor 114 may be collectively supported over the wellbore 102 by support members 115 (e.g., legs). Certain pieces of the surface equipment 110 may be manually operated (e.g., by hand, via a local control panel, etc.) by rig personnel 113 (e.g., a roughneck or another human rig operator) located at various locations (e.g., rig floor 114) of the well construction system 100.

The drill string 120 may comprise a bottomhole assembly 124 (BHA) and tubulars 122 for conveying the BHA 124 within the wellbore 102. The tubulars 122 may be or comprise drill pipe, including heavy-weight drill pipe (HWDP), wired drill pipe (WDP), tough logging condition (TLC) pipe, drill collars, and/or other drill tubulars. The terms "tubular" and "drill pipe" are used hereinafter interchangeably to refer to or indicate an oilfield pipe used to form the drill string 120 for performing wellbore drilling operations. A lower (i.e., downhole) end of the BHA 124 may be or comprise a drill bit 126. The BHA 124 may comprise one or more downhole tools 127 and/or a mud motor 128 above the drill bit 126. Rotation of the drill bit 126 and the weight of the drill string 120 may collectively operate to form the wellbore 102. The drill string 120, including the drill bit 126, may be rotated 119 by a top drive 116 connected to an upper end of the drill string 120.

The top drive 116 may comprise a drive shaft 118 operatively connected with an electric motor 117. The drive shaft 118 may be selectively coupled with the upper end of the drill string 120, and the motor 117 may be selectively operated to rotate 119 the drive shaft 118 to rotate the drill string 120. The top drive 116 may further comprise a grabber, a swivel (neither shown), elevator links 130 terminating with an elevator 132. The grabber may include a clamp that clamps onto a tubular 122 when connecting the tubular 122 to or disconnecting the tubular 122 from the drill string 120. The elevator links 130 and the elevator 132 may be used to lift the drill string 120 and tubulars 122 that are not mechanically coupled to the drive shaft 118. For example, when the drill string 120 is being deployed into or out of the wellbore 102, the elevator 132 may grasp the upper end of the drill string 120 such that the drill string 120 can be raised and lowered when the top drive 116 is raised and lowered.

The top drive 116 may be suspended from (supported by) the support structure 112 via a hoisting system operable to impart vertical motion 141 to the top drive 116, and thus the drill string 120 and disconnected tubulars 122 suspended from (e.g., connected to) the top drive 116. During drilling operations, the top drive 116, in conjunction with operation of the hoisting system, may advance the drill string 120 into the formation 106 to form the wellbore 102. The hoisting system may comprise a traveling block 143, a crown block 145, and a drawworks 140 storing a flexible line 142 (e.g., a cable, a wire rope, etc.). The crown block 145 may be connected to and thus supported by the support structure 112, and the traveling block 143 may be connected to and thus support the top drive 116. The drawworks 140 may be mounted to the rig floor 114. The crown block 145 and traveling block 143 may each comprise pulleys or sheaves around which the flexible line 142 is reeved to operatively connect the crown block 145, the traveling block 143, and the drawworks 140. The drawworks 140 may selectively impart tension to the flexible line 142 to lift and lower the top drive 116, resulting in the vertical motion 141 of the top drive 116 and the drill string 120 (when connected with the top drive 116). For example, the drawworks 140 may be operable to reel in the flexible line 142, causing the traveling block 143 and the top drive 116 to move upward. The drawworks 140 may be further operable to reel out the flexible line 142, causing the traveling block 143 and the top drive 116 to move downward.

The drill string hoisting system may further comprise a position sensor 146 operable to output or otherwise facilitate position data (i.e., position measurements) indicative of position of a predetermined portion of the hoisting system. The position sensor 146 may be or comprise a rotational position sensor disposed or installed in association with, for example, a drum of the drawworks 140. The position sensor 146 may thus be operable to output or otherwise facilitate position data indicative of rotational position of the drum. The position data may be indicative of block position, which may be or comprise position of the traveling block 143 or another portion of the drill string hoisting system (e.g., the top drive 116) supported by the traveling block 143. The position sensor 146 may thus be referred to as a block position sensor, and the position data may thus be referred to as block position data. The position data may be further indicative of rotational speed of the drum, and thus indicative of linear speed of the traveling block 143 and the drill string 120. The position data may be further indicative of rotational acceleration of the drum, and thus linear acceleration of the traveling block 143 and the drill string 120.

The position sensor 146 may be or comprise, for example, an encoder, a rotary potentiometer, or a rotary variable-differential transformers (RVDTs).

An iron roughneck 134 may be positioned on the rig floor 114. The iron roughneck 134 may comprise a torqueing portion 136, such as may include a spinner and a torque wrench comprising a lower tong and an upper tong. The torqueing portion 136 of the iron roughneck 134 may be moveable toward and at least partially around the drill string 120, such as may permit the iron roughneck 134 to make up and break out threaded connection joints between adjacent tubulars 122 of the drill string 120. The torqueing portion 136 may also be moveable away from the drill string 120, such as may permit the iron roughneck 134 to move clear of the drill string 120 during drilling operations. The spinner of the iron roughneck 134 may be utilized to apply low torque to make up and break out the connection joints between tubulars 122 of the drill string 120, and the torque wrench may be utilized to apply a higher torque to tighten and loosen the connection joints.

A set of slips 138 may be located on the rig floor 114, such as may accommodate the drill string 120 during drill string make up and break out operations, drill string running operations, and drilling operations. The slips 138 may be in an open position to permit advancement of the drill string 120 within the wellbore 102 by the hoisting system, such as during the drill string running operations and the drilling operations. The slips 138 may be in a closed position to clamp the upper end (i.e., an uppermost tubular 122) of the drill string 120 to thereby suspend and prevent advancement of the drill string 120 within the wellbore 102, such as during the make up and break out operations.

The hoisting system may deploy the drill string 120 into the wellbore 102 through fluid control equipment 150 for maintaining well pressure control and controlling fluid being discharged from the wellbore 102. The fluid control equipment 150 may be mounted on top of a wellhead 152 installed over the wellbore 102.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 162 holding the drilling fluid 164 (i.e., drilling mud). The drilling fluid circulation system may comprise one or more pumps 160 operable to move the drilling fluid 164 from the container 162 into the fluid passage 121 of the drill string 120 via a fluid conduit 166 (e.g., a stand pipe) extending from the pump 160 to the top drive 116 and an internal passage (not shown) extending through the top drive 116.

During drilling operations, the drilling fluid may continue to flow downhole 123 through the internal passage 121 of the drill string 120. The drilling fluid may exit the BHA 124 via ports in the drill bit 126 and then circulate uphole 125 through an annular space 108 of the wellbore 102. In this manner, the drilling fluid lubricates the drill bit 126 and carries formation cuttings uphole 125 to the wellsite surface 104. The drilling fluid flowing uphole 125 toward the wellsite surface 104 may exit the wellbore 102 via one or more instances of the fluid control equipment 150. The drilling fluid may then pass through one or more fluid conduits 153 (e.g., a gravity line) and drilling fluid reconditioning equipment 154 to be cleaned and reconditioned before returning to the fluid container 162. The drilling fluid reconditioning equipment 154 may also separate drill cuttings 158 from the drilling fluid into a cuttings container 156.

The surface equipment 110 may include tubular handling equipment collectively operable to store, move, connect, and disconnect the tubulars 122 to assemble and disassemble the drill string 120. For example, a catwalk (not shown) may be utilized to convey tubulars 122 from a ground level, such as along the wellsite surface 104, to the rig floor 114, permitting the elevator 132 to grab and lift the tubulars 122 above the wellbore 102 for connection with the drill string 120. The tubular handling equipment may further include a tubular handling device (THD) 180 disposed in association with a vertical pipe rack 182 for storing the conveyance tubulars 122. The vertical pipe rack 182 may comprise or support a fingerboard 184 defining a plurality of slots configured to support or otherwise hold the tubulars 122 within or above a setback 186 (e.g., a platform or another area) located adjacent to, along, or below the rig floor 114. The fingerboard 184 may comprise a plurality of fingers (not shown), each associated with a corresponding slot and operable to close around and/or otherwise interpose individual tubulars 122 to maintain the tubulars 122 within corresponding slots of the fingerboard 184. The vertical pipe rack 182 may be connected with and supported by the support structure 112 or another portion of the well construction system 100. The fingerboard 184/setback 186 provide storage (e.g., a temporary storage) of tubulars 122 during various operations, such as during and between tripping operations of the drill string 120. The THD 180 may be operable to transfer the tubulars 122 between the fingerboard 184/setback 186 and the drill string 120 (i.e., space above the suspended drill string 120). For example, the THD 180 may include arms 188 terminating with clamps 189, such as may be operable to grasp and/or clamp onto one of the tubulars 122. The arms 188 of the THD 180 may extend and retract, and/or at least a portion of the THD 180 may be rotatable and/or movable toward and away from the drill string 120, such as may permit the THD 180 to transfer a tubular 122 between the fingerboard 184/setback 186 and the drill string 120.

During drilling operations, the well construction equipment of the well construction system 100 may progress through a plurality of coordinated well construction operations (i.e., operational sequences) to drill or otherwise construct the wellbore 102. The well construction operations may change based on a digital drilling program, status of the well, status of the subterranean formation, stage of drilling operations (e.g., tripping, drilling, tubular handling, etc.), and type of downhole tubulars 122 utilized, among other examples.

During drilling operations, the hoisting system may lower the drill string 120 while the top drive 116 rotates the drill string 120 to advance the drill string 120 downward within the wellbore 102 and into the formation 106. During the advancement of the drill string 120, the slips 138 are in an open position, and the iron roughneck 134 is moved away or is otherwise clear of the drill string 120. When the upper end of the drill string 120 (i.e., upper end of the uppermost tubular 122 of the drill string 120) connected to the drive shaft 118 is near the slips 138 and/or the rig floor 114, the top drive 116 may cease rotating the drill string 120 and the slips 138 may close to clamp the upper end of the drill string 120. The grabber of the top drive 116 may then clamp the uppermost tubular 122 connected to the drive shaft 118, and the drive shaft 118 may rotate in a direction reverse from the drilling rotation to break out the connection between the drive shaft 118 and the uppermost tubular 122. The grabber of the top drive 116 may then release the uppermost tubular 122.

A new tubular 122 may then be conveyed by the catwalk until the box end of the tubular 122 projects above the rig floor 114. The elevator 132 of the top drive 116 may then grasp the protruding new tubular 122, and the drawworks 140 may be operated to lift the top drive 116, the elevator 132, and the new tubular 122. The hoisting system may then raise the top drive 116, the elevator 132, and the new tubular 122 until the lower end (pin end) of the new tubular 122 is axially aligned with the upper end (box end) of the drill string 120 clamped by the slips 138. The iron roughneck 134 may be moved toward the drill string 120, and the lower tong of the torqueing portion 136 clamps onto the upper end of the drill string 120. The spinner of the iron roughneck 134 may then threadedly connect the lower end of the new tubular 122 with the upper end of the drill string 120. The upper tong of the iron roughneck 134 may then clamp onto the new tubular 122 and rotate with high torque to complete making up a connection (i.e., forming a connection joint) between the new tubular 122 and the drill string 120. In this manner, the new tubular 122 becomes part of the drill string 120. The iron roughneck 134 may then release the drill string 120 and move clear of the drill string 120.

The grabber of the top drive 116 may then clamp onto the drill string 120. The drive shaft 118 may then be lowered into contact with the upper end of the drill string 120 (e.g., the upper end of the newly connected tubular 122) and rotated to make up a connection between the drill string 120 and the drive shaft 118. The grabber may then release the drill string 120, and the slips 138 may be moved to the open position. The drilling operations may then resume.

To trip out the drill string 120, the top drive 116 and the connected drill string 120 may be raised and the slips 138 may be closed around the drill string 120. The elevator 132 may be closed around the drill string 120 and the grabber may clamp the uppermost tubular 122 of the drill string 120. The drive shaft 118 may then be rotated in a direction reverse from the drilling rotation to break out the connection between the drive shaft 118 and the drill string 120. The grabber may then release the uppermost tubular 122 of the drill string 120 and the elevator 132 closed around the drill string 120. The iron roughneck 134 may then be moved toward the drill string 120, the upper tong may clamp onto the uppermost tubular 122 of the drill string 120, and the lower tong may clamp onto a lower tubular 122 of the drill string 120. The upper tong may then rotate the uppermost tubular 122 to provide a high torque to break out the connection between the uppermost tubular 122 and the lower tubular 122. The spinner may then rotate the uppermost tubular 122 to disconnect the uppermost tubular 122 from the rest of the drill string 120 such that the disconnected uppermost tubular 122 is suspended above the rig floor 114 by the elevator 132. The iron roughneck 134 may then release the drill string 120 and move clear of the drill string 120.

The THD 180 may then move toward the drill string 120 to grasp the disconnected tubular 122 suspended from the elevator 132 with the clamps 189 and the elevator 132 may then open to release the tubular 122. The THD 180 may move away from the drill string 120 while grasping the tubular 122, place the tubular 122 in the fingerboard 184/setback 186, and release the tubular 122 for storage. This process may be repeated until the intended length of drill string 120 is removed from the wellbore 102.

The surface equipment 110 of the well construction system 100 may also comprise a control center 170 from which various equipment and equipment subsystems of the well construction system 100 may be monitored and controlled. Equipment subsystems may include a drill string rotation system (e.g., the top drive 116), a hoisting system (e.g., the drawworks 140, the line 142, the blocks 143, 145, etc.), a tubular handling system (e.g., the catwalk, the iron roughneck 134, the THD 180, etc.), a drilling fluid circulation system (e.g., one or more mud pumps 160, the drilling fluid container 162, the fluid conduit 166, etc.), a drilling fluid cleaning and reconditioning system (e.g., the fluid cleaning and reconditioning equipment 154), a well control system (e.g., the fluid control equipment 150), and the BHA 124, among other examples. The control center 170 may be located on the rig floor 114. The control center 170 may comprise a facility 171 (e.g., a room, a cabin, a trailer, etc.) containing a control workstation 172, which may be operated by rig personnel 173 (e.g., a driller or another human drill rig operator) to monitor and control various equipment and equipment subsystems of the well construction system 100.

The control workstation 172 may comprise or be communicatively connected with a central control device 174 (e.g., a processing device, an equipment controller, etc.), such as may be operable to receive, process, and output information to monitor operations of and/or provide control to one or more portions of the well construction system 100. For example, the control device 174 may be communicatively connected with the various surface equipment 110 and/or the BHA 124, and may be operable to receive sensor signals (e.g., sensor measurements and/or other data) from and transmit signals (e.g., control commands, signals, and/or other data) to such equipment to perform various operations described herein. The control device 174 may store executable program code, instructions, and/or operational parameters or setpoints, including for implementing one or more aspects of operations described herein. The control device 174 may be located within and/or outside of the facility 171.

The control workstation 172 may be operable for entering or otherwise communicating control commands to the control device 174 by the rig personnel 173, and for displaying or otherwise communicating information from the control device 174 to the rig personnel 173. The control workstation 172 may comprise one or more input devices 176 (e.g., a keyboard, a mouse, a joystick, a touchscreen, etc.) and one or more output devices 178 (e.g., a video monitor, a touchscreen, a printer, audio speakers, etc.). Communication between the control device 174, the input and output devices 176, 178, and the various wellsite equipment may be via wired and/or wireless communication means. However, for clarity and ease of understanding, such communication means are not depicted, and a person having ordinary skill in the art will appreciate that such communication means are within the scope of the present disclosure.

During well construction operations, the control device 174 may maintain (e.g., record) a pipe tally (i.e., a list or inventory) containing various attributes indicative of or otherwise associated with each tubular 122 (or stand of tubulars 122) that has been received on the rig floor 114 and/or stored in the fingerboard 184 of the pipe rack 182. The pipe tally may be recorded in preparation for drilling or running operations and may include the order in which each tubular 122 is to be deployed into the wellbore 102. The pipe tally may be updated while the tubulars 122 are being retrieved from the wellbore 102. The pipe tally may comprise an identifier (e.g., an identification or serial number) of each tubular 122 in association with various attributes of that tubular 122, such as location on the fingerboard 184, weight, diameter, length, type, and historical use, among other examples. The control device 174 may automatically record (i.e., tally) the identifier of each tubular 122 as it is deployed into and withdrawn from the wellbore 102 to record the order in which each tubular 122 is deployed into and withdrawn from the wellbore 102. The control device 174 may simultaneously update service records of each tubular 122 and/or calculate length of the drill string 120, and thus the wellbore 102, based on the tally. Tallying of the tubulars 122 may be facilitated by a reader (not shown) operable to read the identifier off of a tag (e.g., a radio frequency tag, a magnetic tag, a bar code, a label, etc.) (not shown) associated with each tubular 122, such as when each tubular 122 is received on the rig floor 114 and/or when being deployed into and withdrawn from the wellbore 102. The identifier may then be received by the control device 174 and stored in a memory (e.g., a database) in association with the attributes of that tubular 122, to form or update the pipe tally. The tallying of the tubulars 122 may instead be facilitated by sensors (e.g., weight and/or length sensors) (not shown) operable to determine physical attributes of each tubular 122, such as when each tubular 122 is received on the rig floor 114 and/or when being deployed into and withdrawn from the wellbore 102. The determined attributes may then be received by the control device 174 and stored in the memory in association with an identifier assigned to that tubular 122, to form or update the pipe tally. The pipe tally may thus permit the control device 174 to keep track of location of tubulars that are deployed downhole and stored on the fingerboard 184, thereby permitting the control device 174 to calculate length of the drill string 120 and the wellbore 102.

Other implementations of the well construction system 100 within the scope of the present disclosure may include more or fewer components than as described above and/or depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
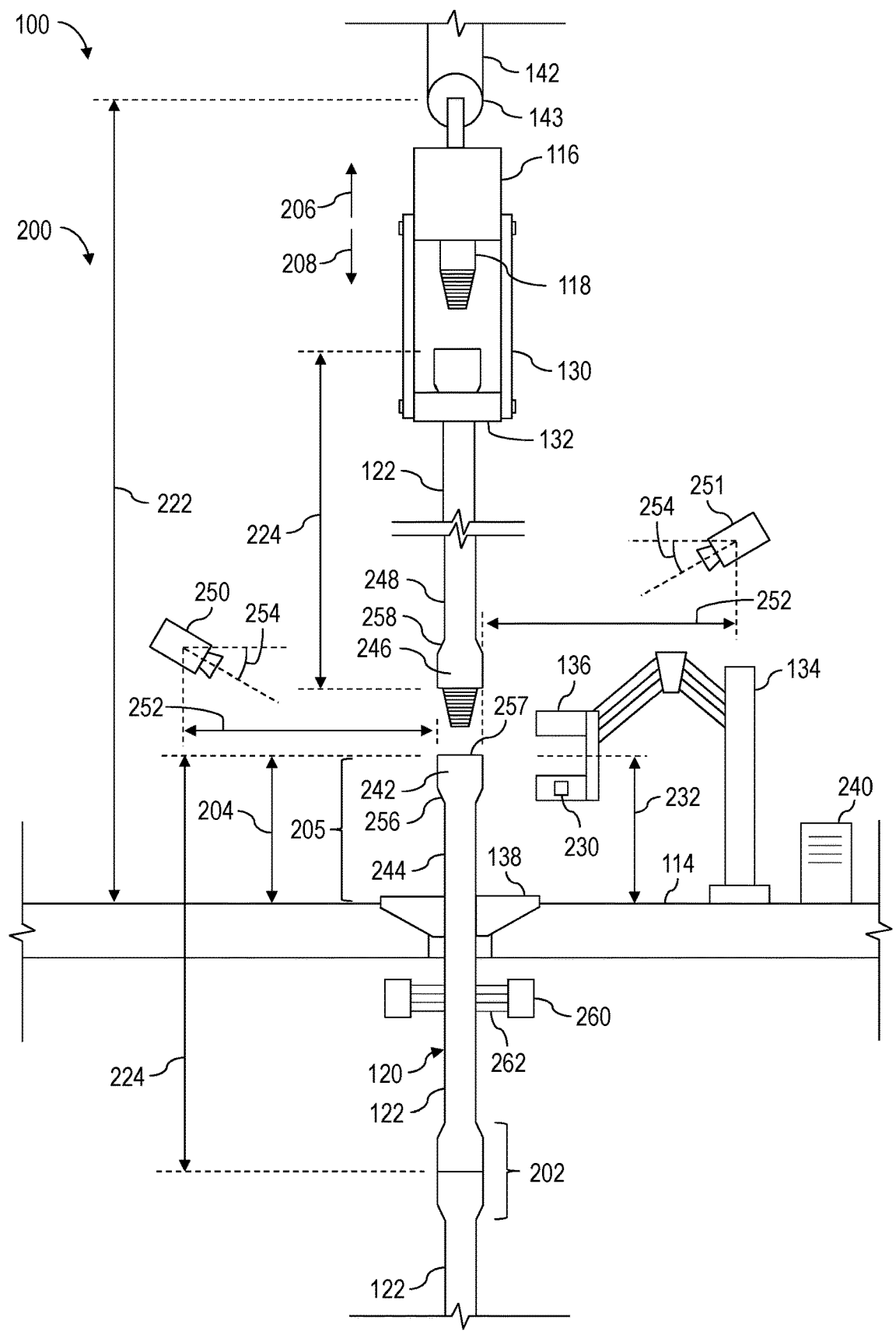
FIG. 2 is a schematic view of at least a portion of an example implementation of apparatus according to one or more aspects of the present disclosure.

FIG. 2 is a schematic view of at least a portion of an example implementation of a monitoring system 200 operable to determine a stickup height 204 of a drill string 120 extending above a rig floor 114 during various stages of well construction operations. The monitoring system 200 may be, form, or be disposed in association with a portion of the well construction system 100 shown in FIG. 1, including where identified by the same reference numerals. Accordingly, the following description refers to FIGS. 1 and 2, collectively.

The drill string 120 may be moved upward 206 and/or downward 208 into and/or out of the wellbore 102 by a hoisting system (e.g., a drawworks 140, blocks 143, 145, and/or a line 142, shown in FIG. 1) of the well construction system 100. The monitoring system 200 may comprise a position sensor 146 (shown in FIG. 1) operable to output or otherwise facilitate position measurements indicative of position of a predetermined portion of the hoisting system with respect to a predetermined portion of the well construction system 100. For example, the position measurements may be or comprise block position measurements indicative of a height 222 (i.e., a block position) of the traveling block 143 of the drill string hoisting system with respect to the rig floor 114. The position sensor 146 may thus be referred to as a block position sensor, and the corresponding position measurements may be referred to as block position measurements.

The monitoring system 200 may further comprise a position sensor 230 operable to output or otherwise facilitate position measurements indicative of a position of an iron roughneck 134 with respect to a predetermined portion of the well construction system 100. For example, the position measurements may be or comprise position measurements indicative of a height 232 (or a distance) of a torqueing portion 136 of the iron roughneck 134 with respect to the rig floor 114. The position sensor 230 may thus be referred to as an iron roughneck position sensor, and the corresponding position measurements may be referred to as iron roughneck position measurements.

The monitoring system 200 may further comprise a processing device 240 (e.g., an equipment control device) such as comprising a processor and a memory storing a computer program code. The computer program code may comprise one or more algorithms, which when executed, may cause the processing device 240 to determine the stickup height 204 of a stickup portion 205 of the drill string 120. The processing device 240 may be or comprise a central control device 174 (shown in FIG. 1) of the well construction system 100 or the processing device 240 may be communicatively connected with the central control device 174. The processing device 240 may be communicatively connected with the position sensors 146, 230.

The processing device 240 may be operable to receive and record the block position measurements indicative of the height 222 of the travelling block 143 while the hoisting system moves the drill string 120 upward 206 and/or downward 208 into and/or out of the wellbore 102. The processing device 240 may be further operable to record and/or access a pipe tally, thereby permitting the processing device 240 to keep track of location and physical attributes (e.g., a measured length 224) of each tubular 122 that is deployed downhole as part of the drill string 120, retrieved to the wellsite surface 104 from the wellbore 102, and/or stored in a fingerboard 184 of a pipe rack 182. The processing device 240 may be further operable to determine the stickup height 204 of the drill string 120 based on the height 222 of the travelling block 143 and the pipe tally. The stickup height 204 may be or comprise a height that the stickup portion 205 of the drill string 120 extends above the rig floor 114. The stickup portion 205 may be or comprise a portion of a tubular 244 of the drill string 120 that is gripped by the slips 138 that extends above the rig floor 114. The stickup portion 205 may comprise a box end 242 (i.e., box or female connector) of the tubular 244. The stickup height 204 may thus comprise a distance between an upper edge 257 of the box end 242 of the tubular 244 while the tubular 244 is locked in position (i.e., gripped) by the slips 138.

After the processing device 240 determines the stickup height 204, the processing device 240 may control or otherwise cause the iron roughneck 134 to lift the torqueing portion 136 to a height 232 that is substantially equal to the determined stickup height 204, such as may permit the torqueing portion 136 to engage the stickup portion 205 of the tubular 244 and a lower portion of an upper tubular 248 to make up (i.e., form or connect) or to break out (i.e., take apart or disconnect) a connection joint 202 therebetween. Specifically, the iron roughneck 134 may be operable to make up or to break out a connection joint 202 between the box end 242 of the lower tubular 244 and a pin end 246 (i.e., pin or female connector) of the upper tubular 248. However, instead of the processing device 240 controlling the iron roughneck 134, the processing device 240 may output the determined stickup height 204 to an iron roughneck control device, which may then control the iron roughneck 134 to cause the iron roughneck 134 to lift the torqueing portion 136 to a height 232 that is substantially equal to the determined stickup height 204, such as may permit the torqueing portion 136 to engage the lower tubular 244 and the upper tubular 248 to make up or to break out a connection joint 202 therebetween.

The processing device 240 may be operable to determine the stickup height 204 before the make up operations when the upper tubular 248 is disconnected from the lower tubular 244. For example, the processing device 240 may determine the stickup height 204 while the drill string 120 is being moved downward 208 during drilling operations to form the wellbore 102 and while the drill string 120 is being moved downward 208 into the wellbore 102 during pipe tripping operations (i.e., during "trip-in" operations) in preparation for subsequent make up operations. During such make up operations, the tubular 244 gripped by the slips 138 is the uppermost tubular of the drill string 120 and the tubular 248 is a new (i.e., not yet connected) tubular that is to be connected with the uppermost tubular 244 of the drill string 120 via the iron roughneck 134. The processing device 240 may determine the stickup height 204 in preparation for subsequent make up operations based on the length 224 of the new tubular 248, a previous stickup height 204 associated with previous make up operations, and by tracking (e.g., recording, counting, etc.) distance (i.e., height) by which the drill string 120 moves downward 208. For example, when a previous connection joint 202 of the drill string 120 was made up by the iron roughneck 134 during the previous make up operations, the previous stickup height 204 associated with the previous connection joint 202 became known, for example, because such previous stickup height 204 was confirmed by successful previous make up operations or manually measured by rig personnel to facilitate the successful previous make up operations. Thus, after successful previous make up operations, the processing device 240 may reset or initiate a distance counter that starts tracking the block position measurements facilitated by the block position sensor 146 to measure, monitor, or otherwise determine change in the height 222 (i.e., distance of movement) of the travelling block 143. The processing device 240 may determine the change in the height 222 based on the tracked block position measurements while the hoisting system is moving the drill string 120 downward 208 until the processing device 240 or another control device causes the hoisting system to stop moving the drill string 120 downward 208 when the box end 242 of the new tubular 248 (now the uppermost tubular 244 of the drill string 120) sticks out above the rig floor 114. The length 224 of the new tubular 248 may be measured before or during the drilling or tripping operations or be otherwise known from the pipe tally, which may be recorded or accessed by the processing device 240.

The processing device 240 may then determine the stickup height 204 based on the previous stickup height 204, the length 224 of the uppermost tubular 244, and the change in the height 222. For example, the stickup height 204 (i.e., the present stickup height) may be equal to the previous stickup height 204 minus the change in the height 222 plus the length 224 of the tubular 244. Consequently, when the hoisting system moves the drill string 120 downward 208 by a distance that is equal to the length 224 of the tubular 244, the present stickup height 204 may be equal to the previous stickup height 204. Accordingly, the stickup height 204 determined during or in preparation for make up operations to assemble and deploy the drill string 120 into the wellbore 102 may be determined by utilizing Equation (1).

$$H_{SU} = H_{PREVSU} - \Delta H_{TB} + L \quad (1)$$

where $H_{SU}$ is the present stickup height 204, $H_{PREVSU}$ is the previous known stickup height 204, $\Delta H_{TB}$ is the change in the height 222 of the travelling block 143, and L is the known length 224 of the tubular 244. After the stickup height 204 is determined, the processing device 240 or another control device may control the iron roughneck 134 to cause the iron roughneck 134 to lift the torqueing portion 136 to a height 232 that is substantially equal to the determined stickup height 204, such as may permit the torqueing portion 136 to engage the tubular 244 and the new tubular 248 to make up a connection joint 202 therebetween to therefore add the new tubular 248 to the drill string 120.

The processing device 240 may be operable to determine the stickup height 204 before the break out operations when the upper tubular 248 is connected to the lower tubular 244. For example, the processing device 240 may determine the stickup height 204 while the drill string 120 is being moved upward 206 out of the wellbore 102 during pipe tripping operations (i.e., during "trip-out" operations) in preparation for subsequent break out operations. During such break out operations, the tubular 244 gripped by the slips 138 is not the uppermost tubular (e.g., a second, third, or fourth tubular) of the drill string 120, but the tubular 248 is the uppermost tubular that is to be disconnected from the tubular 244 via the iron roughneck 134. The processing device 240 may determine the stickup height 204 in preparation for subsequent break out operations based on the length 224 of the tubular 244, a previous stickup height 204 associated with previous break out operations, and by tracking (e.g., recording, counting, etc.) distance (i.e., height) by which the drill string 120 moves upward 206. For example, when a previous connection joint 202 of the drill string 120 was broken out by the iron roughneck 134 during the previous break out operations, the previous stickup height 204 associated with the previous connection joint 202 became known, for example, because such previous stickup height 204 was confirmed by successful previous break out operations or manually measured by rig personnel to facilitate the successful previous break out operations. Thus, after successful previous break out operations, the processing device 240 may reset or initiate a distance counter that starts tracking the block position measurements facilitated by the block position sensor 146 to measure, monitor, or otherwise determine change in the height 222 of the travelling block 143. The processing device 240 may determine the change in the height 222 based on the tracked block position measurements while the hoisting system is moving the drill string 120 upward 206 until the processing device 240 or another control device causes the hoisting system to stop moving the drill string 120 upward 206 when the entire uppermost tubular 244 (now the uppermost tubular 248 of the drill string 120) is positioned above the rig floor 114. The length 224 of the tubular 244 may be measured before or during the drilling or tripping operations when the drill string 120 was being assembled and recorded as part of the pipe tally.

The processing device 240 may then determine the stickup height 204 based on the previous stickup height 204, the length 224 of the uppermost tubular 248, and the change in the height 222. For example, the stickup height 204 (i.e., the present stickup height) may be equal to the previous stickup height 204 plus the change in the height 222 minus the length 224 of the tubular 248. Consequently, when the hoisting system moves the drill string 120 upward 206 by a distance that is equal to the length 224 of the tubular 248, the present stickup height 204 may be equal to the previous stickup height 204. Accordingly, the stickup height 204 determined during break out operations to disassemble and retrieve the drill string 120 out of the wellbore 102 may be determined by utilizing Equation (2).

$$H_{SU} = H_{PREVSU} + \Delta H_{TB} - L \qquad (2)$$

where $H_{SU}$ is the present stickup height 204, $H_{PREVSU}$ is the previous known stickup height 204, $\Delta H_{TB}$ is the change in the height 222 of the travelling block 143, and L is the known length 224 of the tubular 248. After the stickup height 204 is determined, the processing device 240 or another control device may control the iron roughneck 134 to cause the iron roughneck 134 to lift the torqueing portion 136 to a height 232 that is substantially equal to the determined stickup height 204, such as may permit the torqueing portion 136 to engage the tubular 244 and the tubular 248 to break out the connection joint 202 therebetween to therefore disconnect the tubular 248 from the rest of the drill string 120, as shown in FIG. 2.

The monitoring system 200 may comprise a digital video camera 250 positioned and directed (i.e., angled or aimed) toward the stickup portion 205 of the drill string 120 extending above the rig floor 114 such that the box end 242 (i.e., upper end of the drill string 120) or a connection joint 202 of the drill string 120 is within a field of view of the camera 250. The camera 250 may be positioned at a distance 252 from the stickup portion 205 and directed at an angle 254 (e.g., measured with respect to the rig floor 114), which may permit the field of view of the camera 250 to encompass the stickup portion 205 and at least a portion of the tubular 248, and thus capture digital images (e.g., video frames) of the box end 242 (when the tubulars 244, 248 are disconnected) and the connection joint 202 (when the tubulars 244, 248 are connected) during drilling and tripping operations. The camera 250 may be communicatively connected with the processing device 240. The camera 250 may generate, output, or otherwise facilitate a video signal comprising the captured digital images. The processing device 240 may receive and process (i.e., analyze) the digital images captured by the camera 250.

The camera 250 may be remotely controlled, having the ability to set (i.e., change) the distance 252 and/or the angle 254 based on automated control commands from the processing device 240 or manual control commands from a control workstation 172 (shown in FIG. 1) entered by the rig personnel. The distance 252 and/or the angle 254 may be set based on calculations (e.g., estimates) of the stickup height 204 determined based on the pipe tally and the block position measurements, such as may permit the camera 250 to capture digital images of the entire stickup portion 205 and at least a portion of the tubular 248. The stickup height 204 may be calculated based on the lengths 224 of the tubulars 122 (i.e., the pipe tally) and the change in the height 222 of the travelling block 143 (i.e., the block position measurements), as described above.

The computer program code of the processing device 240 may comprise an image recognition program code (e.g., comprising a machine learning algorithm), which when executed, may cause the processing device 240 to receive a digital image containing the stickup portion 205, including the box end 242 (i.e., the upper end) of the lower tubular 244 when the lower tubular 244 and upper tubular 248 are disconnected or the connection joint 202 (i.e., connected box end 242 of the lower tubular 244 and pin end 246 of the upper tubular 248) when the lower tubular 244 and upper tubular 248 are connected. The processing device 240 may then analyze the digital image to recognize (i.e., determining location of) an upper end (i.e., the box end 242 of the lower tubular 244) of the drill string 120 when the lower tubular 244 and upper tubular 248 are disconnected or to recognize the connection joint 202 of the drill string 120 when the lower tubular 244 and upper tubular 248 are connected. The processing device 240 may then determine the stickup height 204 by determining a distance between the upper end of the drill string 120 or the connection joint 202 of the drill string and the rig floor 114. For example, processing device 240 may determine the stickup height 204 based at least in part on location of the upper edge 257 of the box end 242 of the lower tubular 244 on the digital image when the lower tubular 244 and upper tubular 248 are disconnected (e.g., before making up a connection joint 202) or when the lower tubular 244 and upper tubular 248 are connected (e.g., before breaking out a connection joint 202). Thus, after the distance 252 and/or the angle 254 are set and the digital images of the stickup portion 205 are captured by the camera 250 and received by the processing device 240, the processing device 240 may determine the stickup height 204 by determining (i.e., estimating or calculating) the location (e.g., height) of the upper edge 257 on the digital image, recognizing (i.e., determining location of) the rig floor 114 on the digital image, determining the distance between the upper edge 257 and the rig floor 114 on the digital image, and then converting the determined distance between the upper edge 257 and the rig floor 115 on the digital image to physical measurements.

The processing device 240 may analyze the digital images to locate the upper edge 257 of the box end 242 based on a profile of the box end 242 when not connected with the tubular 248 or based on a profile of the connected box and pin ends 242, 246 (i.e., a connection joint 202) of the tubulars 244, 248, respectively, when the tubulars 244, 248 are connected. For example, during drilling and trip-in operations, when the upper tubular 248 is being prepared for connection with the uppermost tubular 244 of the drill string 120, the processing device 240 may recognize the box end 242 of the tubular 244 by locating a profile of the shoulder 256 of the box end 242 of the tubular 244 on the digital image and then determine (i.e., estimate or calculate) location (e.g., height) of the upper edge 257 based on the location (e.g., height) of the shoulder 256 and specifications (e.g., dimensions) of the box end 242 of the tubular 244 when the tubular 244 is not connected to the tubular 248. The processing device 240 may then determine the distance between the upper edge 257 and the rig floor 114 on the digital image and then convert the determined distance to physical measurements to determine the stickup height 204. During trip-out operations, when the upper tubular 248 is connected with the lower tubular 244 forming a connection joint 202 therebetween, the processing device 240 may locate the upper edge 257 by locating a profile of the downward facing shoulder 256 of the box end 242 on the digital image and locating a profile of the upward facing shoulder 258 of the pin end 246 of the upper tubular 248 on the digital image. The processing device 240 may then determine (i.e., estimate or calculate) location (e.g., height) of the upper edge 257 based on location (e.g., height) of the shoulders 256, 258 and specifications (e.g., dimensions) of the ends 242, 246 of the tubulars 244, 248. The processing device 240 may also or instead determine (i.e., estimate or calculate) that the upper edge 257 is located at a midpoint between the shoulders 256, 258 on the digital image. The determined location of the upper edge 257 coincides with or abuts a corresponding contact surface or edge of the pin end 246 of the upper tubular 248, and thus may be or comprise a point of contact or connection between the box and pin ends 242, 246 of the tubulars 244, 248, respectively. The processing device 240 may then determine the distance between the upper edge 257 and the rig floor 114 on the digital image and then convert the determined distance to physical measurements to determine the stickup height 204.

The processing device 240 may be operable to determine the stickup height 204 of the drill string 120 while the drill string 120 is being moved downward 208 into the wellbore 102 during drilling and trip-in operations, and while the drill string 120 is being moved upward 206 out of the wellbore 102 during the trip-out operations. The processing device 240 may be operable to determine the stickup height 204 based on the distance 252 and angle 254 of the camera 250, and various physical and/or operational properties of the camera 250. The processing device 240 may be operable to determine the stickup height 204 further based on the digital image captured by the camera 250. For example, the processing device 240 may be operable to determine the stickup height 204 by counting or otherwise determining a quantity of pixels (i.e., digital image elements) between the upper edge 257 of the box end 242 and the rig floor 114 on the digital image captured by the camera 250, wherein the determined quantity of pixels is indicative of the stickup height 204. The processing device 240 may then convert the determined quantity of pixels to physical measurements to determine the stickup height 204 based on a relationship between the size of a pixel and actual (i.e., real world) linear dimensions. The pixels may be converted into of physical measurements by utilizing or otherwise based on Equation (3).

$$H_{SU} \sim H_{PIXEL} \times \left(\frac{1}{L_{FOCAL}}\right) \times \left(\frac{D}{\text{Cos}\theta}\right) \times \left(\frac{1}{\text{Cos}\theta}\right) \qquad (3)$$

where $H_{SU}$ is the stickup height 204, $H_{PIXEL}$ is the pixel height (i.e., quantity of pixels) spanning between the upper edge 257 of the box end 242 and the rig floor 114 on the digital image, D is a distance 252 between the camera 250 and the stickup portion 205, and $L_{FOCAL}$ is the focal length of the camera 250. The stickup height 204 may be adjusted for the angle 254 of the camera 250, where θ is the angle 254 of the camera 250 with respect to the rig floor 114.

After the stickup height 204 is determined based on the digital image, the processing device 240 or another control device (e.g., the central control device 174 or a local control device disposed in association with or forming a portion of the iron roughneck 134) may control the iron roughneck 134 to cause the iron roughneck 134 to lift the torqueing portion 136 to a height 232 that is substantially equal to the determined stickup height 204. The torqueing portion 136 may then engage the tubular 244 and the new tubular 248 to make up a connection joint 202 therebetween to therefore add the new tubular 248 to the drill string 120. The torqueing portion 136 may instead engage the tubular 244 and the tubular 248 to break out the connection joint 202 therebetween to therefore disconnect the upper tubular 248 from the rest of the drill string 120.

The camera 250 may be a first of a plurality (e.g., two, three, four, or more) of digital video cameras, each positioned and directed toward the stickup portion 205 of the drill string 120 such that the stickup portion 205, including the box end 242 of the lower tubular 244 when the lower tubular 244 and upper tubular 248 are disconnected or the connected ends 242, 246 when the lower tubular 244 and upper tubular 248 are connected, is within a field of view of each of the cameras. Each camera may comprise features and modes of operation of the camera 250 described herein. For example, the monitoring system 200 may comprise a second digital video camera 251 positioned and directed toward the stickup portion 205 of the drill string 120 such that the stickup portion 205 is within a field of view of the camera 251. The camera 251 may comprise features and modes of operation of the camera 250 described herein. The camera 251 may be positioned at a distance 252 from the stickup portion 205 and directed at an angle 254, which may permit the field of view of the camera 251 to encompass the stickup portion 205 and at least a portion of the upper tubular 248 and thus capture digital images (e.g., video frames) of the stickup portion 205 and the upper tubular 248 during drilling and tripping operations. The camera 251 may be communicatively connected with the processing device 240. The camera 251 may generate, output, or otherwise facilitate a video signal comprising the captured digital images containing the stickup portion 205 and at least a portion of the upper tubular 248. The processing device 240 may receive and process (i.e., analyze) the digital images captured by the camera 251. The camera 251 may be located at a different angular (i.e., azimuthal) position with respect to (i.e., on a different side of) the stickup portion 205. For example, the camera 251 may be located at an angular position that is 90 degrees from the angular position of the camera 250.

The processing device 240 may be further operable to receive the digital image from the plurality of cameras, including camera 251, and analyze the digital image to determine the stickup height 204 based on that digital image similarly as the processing device 240 determines the stickup height 204 based on that digital image from the camera 250. For example, the processing device 240 may recognize (i.e., determining location of) on the digital image received from the camera 251 the box end 242 (i.e., the upper end) of the tubular 244, including the shoulder 256, when the tubular 244 is not connected to the tubular 248, or recognize on the digital image received from the camera 251 the connected box end 242 and pin end 246, including the shoulders 256, 258, when the tubulars 244, 248 are connected together. When the tubulars 244, 248 are connected together, the processing device 240 may then determine (i.e., estimate or calculate) location (e.g., height) of the upper edge 257 based on location (e.g., height) of the shoulder 256 and/or specifications (e.g., dimensions) of the box end 242 of the tubular 244 when the tubular 244 is not connected to the tubular 248, or based on location of the shoulders 256, 258 and/or specifications of the ends 242, 246 of the tubulars 244, 248, and/or by determining a midpoint between the shoulders 256, 258. The processing device 240 may also recognize (i.e., determine location of) the rig floor 114 on the digital image received from the camera 251. The processing device 240 may determine the stickup height 204 by determining the distance between the upper edge 257 and the rig floor 114 on the digital image and then converting the determined distance between the upper edge 257 and the rig floor 115 on the digital image to physical measurements.

The processing device 240 may be operable to recognize the box end 242 (e.g., by recognizing the shoulder 256) of the lower tubular 244 or a connection joint 202 (e.g., by recognizing the shoulders 256, 258) of the connected tubulars 244, 248 on the digital images captured by each of the cameras 250, 251 with a corresponding confidence level (i.e., such as in terms of percentage) indicative of level of certainty (or definiteness) that the image recognition program code executed by the processing device 240 recognizes the box end 242 (e.g., recognizes the shoulder 256) of the lower tubular 244 or recognizes the connection joint 202 (e.g., recognizes the shoulders 256, 258). Such confidence level, at least in part, may be based on or affected by weather conditions on the rig floor 214, light conditions on the rig floor 214, cleanliness of the tubulars 244, 248, wear and tear of the tubulars 244, 248, resolution of the camera 250, error margin in the distance 252, and error margin in the angle 254, among other examples.

The processing device 240 may be further operable to determine the stickup height 204 based on digital images from one or more of the cameras 250, 251 that cause the processing device 240 to recognize the box end 242 (i.e., upper end of the drill string 120) or the connected ends 242, 246 (i.e., the connection joint 202 of the drill string 120) with a greater (i.e., higher) confidence level, as a lower confidence level may result in a false positive (i.e., a false detection or recognition) of the box end 242 or the connected ends 242, 246. For example, the processing device 240 may be operable to receive a first digital image containing the box end 242 or the connected ends 242, 246 facilitated by the camera 250, receive a second digital image containing the box end 242 or the connected ends 242, 246 facilitated by the camera 251, recognize the box end 242 or the connected ends 242, 246 on the first digital image with a first confidence level, and recognize the box end 242 or the connected ends 242, 246 on the second digital image with a second confidence level. The processing device 240 may then determine the stickup height 204 based on one of the first digital image and the second digital image that is associated with a greater one of the first confidence level and the second confidence level, and output the determined stickup height 204 directly to the iron roughneck 134 or to a control device for controlling the iron roughneck 134 to position the iron roughneck 134 at a height that permits the iron roughneck 134 to make up or break out a connection between adjacent tubulars 244, 248. However, when the first and the second confidence levels both exceed a predetermined threshold (e.g., 95%), processing device 240 may determine a first stickup height based on the first digital image and a second stickup height based on the second digital image. The processing device 240 may then determine the stickup height 204 as the average of the first stickup height and the second stickup height, such that the stickup height 204 is or comprises an average of both first and second stickup heights. The processing device 240 may be further operable to output the selected or average stickup height 204 directly to the iron roughneck 134 or to a control device for controlling the iron roughneck 134 to position the iron roughneck 134 based on the selected stickup height 204 at a height 232 that permits the iron roughneck 134 to make up or break out a connection between the adjacent tubulars 244, 248.

The processing device 240 may use the stickup height 204 determined based on the digital images of the box end 242 or the connected ends 242, 246 captured by the video cameras 250, 251 when the confidence level of detection of the box end 242 or the connected ends 242, 246 is equal to or greater than a predetermined confidence threshold (e.g., equal to or greater than about 85%, 90%, or 95%). However, when the confidence level is below the predetermined confidence threshold, the processing device 240 may disregard (i.e., ignore) the stickup height 204 determined based on the digital images of the box end 242 or the connected ends 242, 246. When the confidence level is below the predetermined confidence threshold, the processing device 240 may instead use the stickup height 204 determined based on the pipe tally and the block position measurements. When the confidence level is below the predetermined confidence threshold, the processing device 240 may instead output a signal to a human drill rig operator to indicate to the human drill rig operator to manually adjust position of the iron roughneck 134 to a height that permits the iron roughneck 134 to make up or break out a connection between adjacent tubulars 244, 248. Thus, when the stickup height 204 determined based on the digital images is below a predetermined confidence threshold, the processing device 240 may output a visual signal (e.g., a blinking light or icon on a video screen) and/or an audio signal (e.g., an alarm) to rig personnel (e.g., a human drill rig operator, such as a driller) to direct or indicate to the rig personnel to manually enter or confirm an actual stickup height 204. For example, the rig personnel may manually adjust (e.g., lift) position of the iron roughneck 134 (e.g., the torqueing portion 136) to an actual stickup height 204 and/or to the upper edge 257 of the stickup portion 205 (or to confirm that the iron roughneck 134 is positioned at the actual stickup height 204 and/or at the upper edge 257) at which the iron roughneck 134 can make up or break out a connection between adjacent tubulars 244, 248. The rig personnel or a control device (e.g., the processing device 240) may then cause the torqueing portion 136 to engage the tubular 244 and the tubular 248 to make up or break out a connection joint 202 therebetween. The rig personnel may instead manually enter information indicative of the actual stickup height 204 and/or the upper edge 257 into the processing device 240 or another control device. The processing device 240 or the another control device may then control the iron roughneck 134 to cause the iron roughneck 134 to lift the torqueing portion 136 to a height 232 that is substantially equal to the entered actual stickup height 204.

The stickup height 204 determined based on the pipe tally and the block position measurements, as described above, may have or be associated with an error margin (e.g., defined in terms of length) or level of accuracy (e.g., defined in terms of percentage of determined stickup height 204). The error margin of the stickup height 204 may define an expected range of the stickup height 204. The stickup height range may define an expected (i.e., likely) minimum and an expected maximum level of the stickup height 204. The error margin of the stickup height 204 may be, at least in part, caused by or otherwise based on error margin of the measured length 224 of the tubulars 122 and/or error margin of the measured change in the height 222, which may be related to level of accuracy of the block position sensor 146. The processing device 240 may use the stickup height 204 determined based on the length 224 of the tubulars 122 (i.e., the pipe tally) and the change in the height 222 of the travelling block 143 (i.e., the block position measurements) to automate the iron roughneck 134 when overall error margin of such determined stickup height 204 is below a predetermined threshold (e.g., between about +/−2 inches).

The error margin of the stickup height 204 determined based on the pipe tally and the block position measurements is typically higher than the error margin of the stickup height 204 determined based on the digital images captured by each of the cameras 250, 251. In such situations, the processing device 240 may output the stickup height 204 determined based on the digital image to a control device for controlling the iron roughneck 134 such that the control device can position the iron roughneck 134 at a height that permits the iron roughneck 134 to make up or break out a connection between adjacent tubulars 244, 248. However, the error margin of the stickup height 204 determined based on the digital images may be appreciably higher than the error margin of the stickup height 204 determined based on the pipe tally and the block position measurements when the processing device 240 falsely recognizes the box end 242 or the connected ends 242, 246 on the digital images (i.e., when the box end 242 or the connected ends 242, 246 is not actually on the digital images). The processing device 240 may be further operable to reduce cases of false positive recognition of the box end 242 or the connected ends 242, 246, and thus miscalculation of the stickup height 204 based on the digital images captured by each of the cameras 250, 251, by utilizing the error margin and/or the expected range of the stickup height 204 determined based on the pipe tally and the block position measurements to cancel or disregard the stickup height 204 (regardless of the confidence level of detection of the box end 242 or the connected ends 242, 246) determined based on the digital images and miscalculated based on the false positive detection of the box end 242 or the connected ends 242, 246. In such situations, the processing device 240 may use the stickup height 204 determined based on the pipe tally and the block position measurements to control the iron roughneck 134 to cause the iron roughneck 134 to lift the torqueing portion 136 to a height 232 that is substantially equal to the entered actual stickup height 204. The rig personnel may instead manually enter information indicative of the actual stickup height 204 and/or location of the upper edge 257 into the processing device 240 or another control device. The processing device 240 or the another control device may then control the iron roughneck 134 to cause the iron roughneck 134 to lift the torqueing portion 136 to a height 232 that is substantially equal to the entered actual stickup height 204.

In some situations, the stickup height 204 determined based on the pipe tally and the block position measurements has an error margin that is too great to be used for controlling the height of the iron roughneck 134 to make up or break out a connection between adjacent tubulars 244, 248. In such situations, the stickup height 204 determined based on the pipe tally and block position measurements can be used to improve the confidence level of the stickup height 204 determined based on the digital images by disregarding the stickup height 204 determined based on a false detection (i.e., a false positive) of the box end 242 or the connected ends 242, 246, such as when the processing device 240 executing the image recognition program code indicates that the box end 242 or the connected ends 242, 246 are present at the indicated height in the digital images captured by the cameras 250, 251, but in reality, neither the box end 242 nor the connected ends 242, 246 are present in the digital images. For example, when the stickup height 204 determined based on the digital images has a confidence level above a predetermined threshold and the stickup height 204 determined based on the digital images is within the expected range of the stickup height 204 determined based on the pipe tally and block position measurements, the processing device 240 may output the stickup height 204 determined based on the digital images directly to the iron roughneck 134 or to a control device for controlling the iron roughneck 134 to move the iron roughneck 134 to a height that permits the iron roughneck 134 to make up or break out a connection between adjacent tubulars 244, 248. However, when the stickup height 204 determined based on the digital images is outside the expected range of the stickup height 204 determined based on the pipe tally and block position measurements, the processing device 240 may disregard the stickup height 204 determined based on the digital images, regardless of the confidence level of detection of the box end 242 or the connected ends 242, 246.

In addition, the stickup height 204 determined based on the pipe tally and the block position measurements may be used to indicate a false nondetection (i.e., a false negative) of the box end 242 or the connected ends 242, 246, such as when the processing device 240 executing the image recognition program code indicates that the box end 242 or the connected ends 242, 246 are not present at the indicated height in the digital images captured by the cameras 250, 251, but in reality, either the box end 242 or the connected ends 242, 246 are present in the digital images. If the processing device 240 determines (i.e., calculates or estimates) the stickup height 204 based on the pipe tally and the block position measurements having an error margin that is within (i.e., smaller than) a predetermined error margin threshold and the processing device 240 executing the image recognition program code does not detect the box end 242 or the connected ends 242, 246, the processing device 240 may output a video and/or an audio signal to the rig personnel (e.g., the driller) to indicate to the rig personnel to manually adjust position of the iron roughneck 134 to a height that permits the iron roughneck 134 to make up or break out a connection between adjacent tubulars 244, 248. Thus, when the processing device 240 executing the image recognition program code does not recognize the box end 242 or the connected ends 242, 246 on the digital image within the expected range of the stickup height 204 determined based on the pipe tally and the block position measurements, the processing device 240 may output a signal to the rig personnel to indicate to the rig personnel to manually adjust position of the iron roughneck 134 to the height that permits the iron roughneck 134 to perform make up or break out operations. In such situation, the processing device 240 may instead use the stickup height 204 determined based on the pipe tally and the block position measurements to control the iron roughneck 134 to cause the iron roughneck 134 to lift the torqueing portion 136 to a height 232 that is substantially equal to the entered actual stickup height 204.

The processing device 240 may receive current digital images facilitated by the digital cameras 250, 251, recognize the box end 242 (by detecting the shoulder 256) or the connected ends 242, 246 (by detecting the shoulders 256, 258) on the current digital images by comparing the current digital images to past (or historical) digital images containing box ends 242 and connected ends 242, 246 of different tubulars 244, 248, and determine the stickup height 204 based at least in part on location of the box end 242 and the connected ends 242, 246 on the past digital images. The past digital images may be stored on a database, which may be or comprise a memory or a data storage device internal to or external to and communicatively connected with the processing device 240. The database may contain or store past digital images containing box ends 242 and connected ends 242, 246 of different tubulars 244, 248 captured during various operations and/or various environmental conditions. Each digital image in the database may be labeled, containing information indicative of location of one or more features of the box end 242 or the connected ends 242, 246 of the other tubulars 244, 248. For example, each labeled digital image may identify location of the upper edge 257 with respect to the profiles of one or both of the shoulders 256, 258. Each labeled digital image may also or instead identify just the location of one or both of the shoulders 256, 258. Each labeled digital image may also or instead identify the profile of the box end 242, the pin end 246, and/or the connected ends 242, 246. The processing device 240 may thus recognize the box end 242 or the connected ends 242, 246 on the current digital image based on the past digital images of the box ends 242, the pin ends 246, and/or the connected ends 242, 246 of different tubulars 244, 248 recorded in the image database.

When the processing device 240 is unable to recognize the box end 242 or the connected ends 242, 246 on the digital images captured by the cameras 250, 251 with a confidence level that is above the predetermined confidence threshold, the processing device 240 may further improve its image recognition capability by adding such digital images of the box end 242 and the connected ends 242, 246 to the database. The machine learning algorithm may analyze the new images to improve recognition of the box end 242 and the connected ends 242, 246, such as by improving recognition of the shoulder 256 of the box end 242 and/or shoulder 258 of the pin end 246 captured in subsequent digital images. For example, during make up and break out operations, when the confidence level of recognition of the box end 242 and the connected ends 242, 246, respectively, is below the predetermined confidence threshold, the processing device 240 may receive from the driller or other rig personnel a confirmation that a digital image facilitated by one or more of the cameras 250, 251 contains the box end 242 or the connected ends 242, 246 or adjust position of one or more of the cameras 250, 251 to permit the cameras 250, 251 to capture a digital image of the box end 242 or the connected ends 242, 246. The processing device 240 may then label the digital image containing the box end 242 and the connected ends 242, 246 and add the labeled image to the image database. Each new digital image analyzed and saved to the database becomes part of the database and can be used to enhance accuracy of the image recognition algorithm to recognize the box end 242 of a future tubular 244 and the connected ends 242, 246 of future connected tubulars 244, 248.

The ability of the monitoring system 200 to accurately recognize the box end 242 and the connected ends 242, 246 may be affected by the cleanliness of the drill string 120 (e.g., the tubulars 244, 248) when the drill string 120 is being withdrawn from the wellbore 102. The well construction system 100 may thus further comprise a cleaning device 260 disposed below the rig floor 114 such that the cleaning device 260 cleans the drill string 120 while the hoisting system moves the drill string 120 out of the wellbore 102. The cleaning device 260 may comprise one or more bristles, scrapers, and water jets extending circumferentially around the drill string 120 and operable to clean the outer surface of the drill string 120 as it is hoisted out of the wellbore 102 to remove dirt, grime, mud, contaminants, particles, and/or other matter that may settle on or adhere to the outer surface of the drill string 120 and alter or distort the profile of the outer surface of the drill string 120, including the profile of the shoulders 256, 258. Clean and accurate profile of the shoulders 256, 258 may facilitate or permit the processing device 240 to identify the shoulders 256, 258 on the digital image with a greater confidence level. The processing device 240 may then determine the location of the upper edge 257 and the rig floor 114 and determine the stickup height 204.

Figure 3:
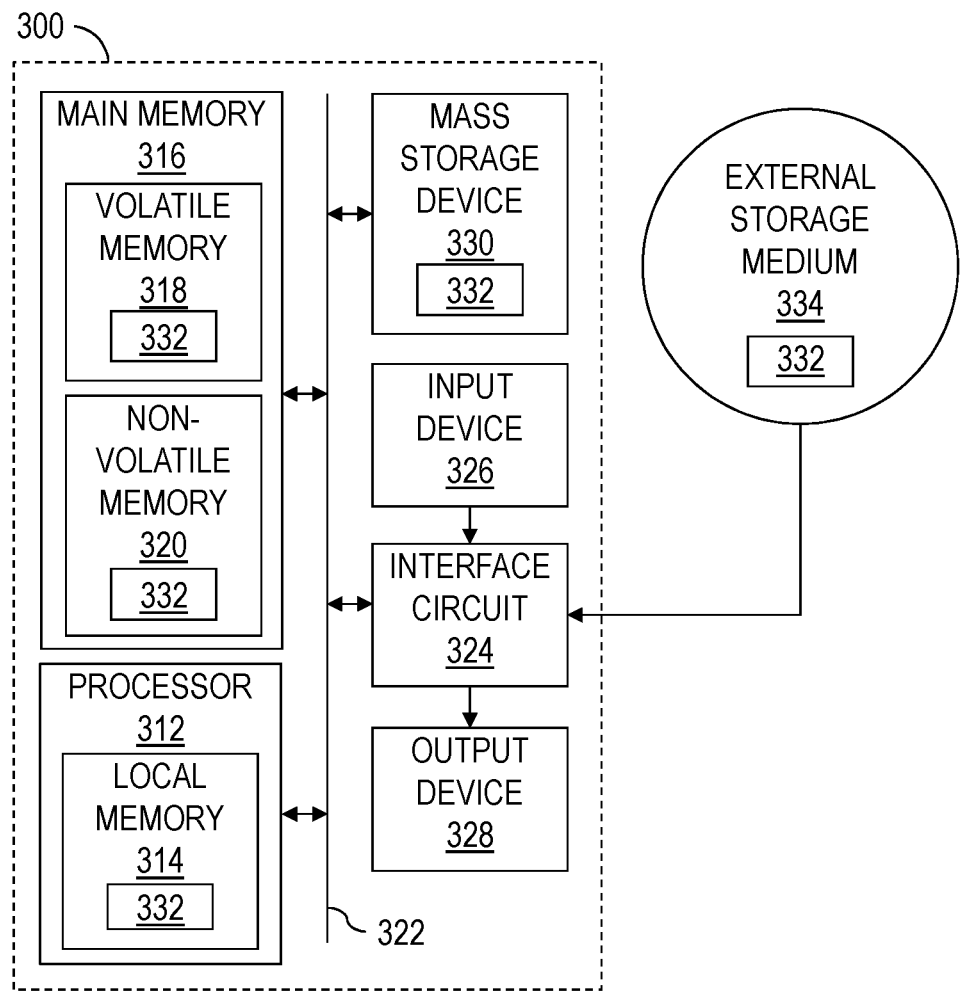
FIG. 3 is a schematic view of at least a portion of an example implementation of apparatus according to one or more aspects of the present disclosure.

FIG. 3 is a schematic view of at least a portion of an example implementation of a processing device 300 (or system) according to one or more aspects of the present disclosure. The processing device 300 may be or form at least a portion of one or more control devices and/or other electronic devices shown in one or more of the FIGS. 1-2. Accordingly, the following description refers to FIGS. 1-3, collectively.

The processing device 300 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. One or more instances of the processing device 300 may be or form at least a portion of the monitoring system 200 or another monitoring and/or control system of the well construction system 100. For example, one or more instances of the processing device 300 may be or form at least a portion of the control workstation 172, the central controller 174, and/or the processing device 240. Although it is possible that the entirety of the processing device 300 is implemented within one device, it is also contemplated that one or more components or functions of the processing device 300 may be implemented across multiple devices, some or an entirety of which may be at the wellsite and/or remote from the wellsite.

The processing device 300 may comprise a processor 312, such as a general-purpose programmable processor. The processor 312 may comprise a local memory 314 and may execute machine-readable and executable program code instructions 332 (i.e., computer program code) present in the local memory 314 and/or another memory device. The processor 312 may execute, among other things, the program code instructions 332 and/or other instructions and/or programs to implement the example methods and/or operations described herein. For example, the program code instructions 332, when executed by the processor 312 of the processing device 300, may cause one or more portions or pieces of well construction equipment within the scope of the present disclosure to perform the example methods and/or operations described herein.

The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM and/or PICO families of microcontrollers, embedded soft/hard processors in one or more FPGAs.

The processor 312 may be in communication with a main memory 316, such as may include a volatile memory 318 and a non-volatile memory 320, perhaps via a bus 322 and/or other communication means. The volatile memory 318 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing device 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third-generation input/output (3GIO)

interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 300 may be in communication with various sensors, video cameras, actuators, processing devices, control devices, and other devices of the well construction system via the interface circuit 324. The interface circuit 324 can facilitate communications between the processing device 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit rig personnel to enter the program code instructions 332, which may be or comprise control data, operational parameters, operational setpoints, a well construction drill plan, and/or database of operational sequences. The program code instructions 332 may further comprise modeling or predictive routines, equations, algorithms, processes, applications, and/or other programs operable to perform example methods and/or operations described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., an LCD, an LED display, a CRT display, a touchscreen, etc.), printers, and/or speakers, among other examples. The one or more input devices 326 and the one or more output devices 328 connected to the interface circuit 324 may, at least in part, facilitate the HMIs described herein.

The processing device 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing device 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 may be stored in the mass storage device 330, the main memory 316, the local memory 314, and/or the removable storage medium 334. Thus, the processing device 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may perform and/or cause performance of example methods, processes, and/or operations described herein.

The present disclosure is further directed to example methods (e.g., operations, processes, actions, etc.) for monitoring and controlling well construction equipment 110, 120 of a well construction system 100. In the following description, one or more descriptors and/or other references to such example methods may not be applicable to the entirety of one or more of the methods. That is, such references may instead be applicable to just one or more aspects of one or more of the methods. Thus, references to "the example methods" are to be understood as being applicable to the entirety of one or more of the methods and/or one or more aspects of one or more of the methods.

The example methods may be performed utilizing or otherwise in conjunction with one or more implementations of one or more instances of one or more components of the apparatus shown in one or more of FIGS. 1-3 and/or otherwise within the scope of the present disclosure. For example, the example methods may be at least partially performed (and/or caused to be performed) by a processing device, such as the processing device 300, executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be at least partially performed (or be caused to be performed) by a human user (e.g., rig personnel) utilizing one or more implementations of one or more instances of one or more components of the apparatus shown in one or more of FIGS. 1-3 and/or otherwise within the scope of the present disclosure. Accordingly, the following description refers to apparatus shown in one or more of FIGS. 1-3 and example methods that may be performed by such apparatus. However, the example methods may also be performed in conjunction with implementations of apparatus other than those depicted in FIGS. 1-3 that are also within the scope of the present disclosure.

In view of the entirety of the present disclosure, including the figures and the claims, a person having ordinary skill in the art will readily recognize that the present disclosure introduces an apparatus comprising a monitoring system for determining a stickup height of a drill string for drilling a wellbore, wherein the drill string comprises a plurality of drill pipes assembled via equipment of a drill rig, and wherein the monitoring system comprises: (A) a block position sensor operable to facilitate block position measurements indicative of a position of a travelling block of a hoisting system; and (B) a processing device comprising a processor and a memory storing a computer program code, wherein the processing device is operable to: (1) record a pipe tally indicative of a length of each drill pipe of the drill string and a location of each drill pipe within the drill string; (2) receive the block position measurements while the hoisting system moves the drill string; and (3) determine the stickup height based on the pipe tally and the block position measurements.

The processing device may be further operable to determine a change in the position of the travelling block based on the block position measurements, and the processing device may be operable to determine the stickup height based on the length of an uppermost drill pipe of the drill string and the change in the position of the travelling block.

The processing device may be further operable to output the determined stickup height to a control device for controlling an iron roughneck such that the control device can position the iron roughneck at a height that permits the iron roughneck to perform make up or break out operations.

The monitoring system may further comprise a video camera operable to facilitate a digital image containing an upper end of the drill string or a connection joint of the drill string, and the processing device may be further operable to receive the digital image and determine the stickup height of the drill string based on the digital image by: recognizing the upper end of the drill string or the connection joint of the drill string on the digital image; determining a distance between the upper end of the drill string or the connection joint of the drill string and a rig floor on the digital image; and converting the determined distance on the digital image to physical measurements.

The stickup height determined based on the pipe tally and the block position measurements may be a first stickup height, the first stickup height may have an error margin that defines a range of the first stickup height, the monitoring system may further comprise a video camera operable to facilitate a digital image containing an upper end of the drill string or a connection joint of the drill string, and the processing device may be further operable to: receive the digital image; determine a second stickup height based on the digital image; and, when the second stickup height is outside the range of the first stickup height, disregard the second stickup height.

The stickup height determined based on the pipe tally and the block position measurements may have an error margin that defines a range of the stickup height, the monitoring system may further comprise a video camera operable to facilitate a digital image containing an upper end of the drill string or a connection joint of the drill string, and the processing device may be further operable to: receive the digital image; recognize the upper end of the drill string or the connection joint of the drill string on the digital image; and, when the processing device does not recognize the upper end of the drill string or the connection joint of the drill string on the digital image within the range of the stickup height, output a signal to a human drill rig operator to indicate to the human drill rig operator to manually adjust position of the iron roughneck to the height that permits the iron roughneck to perform make up or break out operations.

The monitoring system may further comprise a video camera operable to facilitate a digital image containing an upper end of the drill string or a connection joint of the drill string, and the processing device may be further operable to: receive the digital image; recognize the upper end of the drill sting or the connection joint of the drill string on the digital image by comparing the digital image to a database comprising a plurality of images labeled with features of the upper ends of other drill strings and features of the connection joints of other drill strings; and determine the stickup height based at least in part on location of the upper end of the drill sting or the connection joint of the drill string on the digital image. In such implementations, among others within the scope of the present disclosure, the processing device may be further operable to recognize the upper end of the drill string or the connection joint of the drill string on the digital image with a confidence level and, when the confidence level is below a predetermined confidence threshold: receive from a human drill rig operator a confirmation that the digital image contains the upper end of the drill string or the connection joint of the drill string; and record the digital image labeled with features of the upper end of the drill string or features of the connection joint of the drill string to the database.

The monitoring system may further comprise: a first video camera operable to facilitate a first digital image containing an upper end of the drill string or a connection joint of the drill string; and a second video camera operable to facilitate a second digital image containing the upper end of the drill string or the connection joint of the drill string. In such implementations, among others within the scope of the present disclosure, the processing device may be further operable to: receive the first digital image and the second digital image; recognize the upper end of the drill string or the connection joint of the drill string on the first digital image with a first confidence level; recognize the upper end of the drill string or the connection joint of the drill string on the second digital image with a second confidence level; determine the stickup height based on one of the first digital image and the second digital image that is associated with a greater one of the first confidence level and the second confidence level; and output the determined stickup height to a control device for controlling an iron roughneck such that the control device can position the iron roughneck at a height that permits the iron roughneck to perform make up or break out operations.

The monitoring system may comprise a video camera operable to facilitate a digital image containing an upper end of the drill string or a connection joint of the drill string, the processing device may be operable to receive the digital image and determine the stickup height based on the digital image, and the drill rig may comprise a cleaning device disposed below the rig floor such that the cleaning device cleans the drill string while the hoisting system moves the drill string.

The present disclosure also introduces an apparatus comprising a monitoring system for determining a stickup height of a drill string for drilling a wellbore, wherein the drill string comprises a plurality of drill pipes assembled via equipment of a drill rig, and wherein the monitoring system comprises: (A) a video camera operable to facilitate a digital image containing an upper end of the drill string or a connection joint of the drill string; and (B) a processing device comprising a processor and a memory storing a computer program code, wherein the processing device is operable to: (1) receive the digital image; (2) recognize the upper end of the drill string or the connection joint of the drill string on the digital image based on other images containing upper ends of other drill strings and connection joints of other drill strings recorded in an image database; and (3) determine the stickup height based at least in part on location of the upper end of the drill string or the connection joint of the drill string on the digital image.

The processing device may be operable to determine the stickup height based at least in part on the location of the upper end of the drill string or the connection joint of the drill string on the digital image by: determining distance between the upper end of the drill string or the connection joint of the drill string and a rig floor on the digital image; and converting the determined distance to physical measurements.

The processing device may be further operable to recognize the upper end of the drill string or the connection joint of the drill string on the digital image with a confidence level and, when the confidence level is below a predetermined confidence threshold: receive from a human drill rig operator a confirmation that the digital image contains the upper end of the drill string or the connection joint of the drill string; and record the digital image to an image database.

The stickup height determined based on the digital image may be a first stickup height, the monitoring system may further comprise a block position sensor operable to facilitate block position measurements indicative of a position of a travelling block of a hoisting system, and the processing device may be further operable to: record a pipe tally indicative of a length of each drill pipe of the drill string and a location of each drill pipe within the drill string; receive the block position measurements while the hoisting system moves the drill string; and determine a second stickup height based on the pipe tally and the block position measurements. In such implementations, among others within the scope of the present disclosure, the second stickup height may have an error margin that defines a range of the second stickup height, and the processing device may be further operable to, when the first stickup height is outside the range of the second stickup height, disregard the first stickup height. The second stickup height may have an error margin that defines a range of the second stickup height, and the processing device may be further operable to, when the processing device does not recognize the upper end of the drill string or the connection joint of the drill string on the digital image within the range of the second stickup height, output a signal to a human drill rig operator to indicate to the human drill rig operator to manually adjust position of the iron roughneck to the height that permits the iron roughneck to perform make up or break out operations.

The drill rig may comprise a cleaning device disposed below the rig floor such that the cleaning device may clean the drill string while a hoisting system moves the drill string.

The present disclosure also introduces an apparatus comprising a monitoring system for determining a stickup height of a drill string for drilling a wellbore, wherein the drill string comprises a plurality of drill pipes assembled via equipment of a drill rig, and wherein the monitoring system comprises: (A) a plurality of video cameras each operable to facilitate a digital image containing an upper end of the drill string or a connection joint of the drill string; and (B) a processing device comprising a processor and a memory storing a computer program code, wherein the processing device is operable to: (1) receive the digital images facilitated by the cameras; (2) recognize the upper end of the drill string or the connection joint of the drill string on each digital image; (3) determine a confidence level of recognition of the upper end of the drill string or the connection joint of the drill string for each digital image; (4) determine the stickup height based on one or more of the digital images associated with a highest confidence level of recognition; and (5) output the determined stickup height to a control device for controlling an iron roughneck such that the control device can position the iron roughneck at a height that permits the iron roughneck to perform make up or break out operations.

The processing device may be operable to determine the stickup height by: determining a distance between the upper end of the drill string or the connection joint of the drill string and a rig floor on the one or more of the digital images associated with the highest confidence level of recognition; and converting the determined distance to physical measurements.

The processing device may be further operable to: recognize the upper end of the drill string or the connection joint of the drill string on each digital image by comparing each digital image to a database comprising a plurality of images labeled with features of the upper ends of other drill strings and features of the connection joints of other drill strings; and determine the stickup height based at least in part on location of the upper end of the drill sting or the connection joint of the drill string on the one or more of the digital images associated with the highest confidence level of recognition.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the scope of the present disclosure, and that they may make various changes, substitutions and alterations herein without departing from the scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a monitoring system for determining a stickup height of a drill string for drilling a wellbore, wherein the drill string comprises a plurality of drill pipes assembled via equipment of a drill rig, and wherein the monitoring system comprises:
a block position sensor configured to facilitate block position measurements indicative of a position of a travelling block of a hoisting system; and
a processing device comprising a processor and a memory storing a computer program code, wherein the processing device is configured to:
record a pipe tally indicative of a length of each drill pipe of the drill string and a location of each drill pipe within the drill string;
receive the block position measurements while the hoisting system moves the drill string; and
determine the stickup height based on the pipe tally and the block position measurements.

2. The apparatus of claim 1 wherein the processing device is further configured to determine a change in the position of the travelling block based on the block position measurements, and wherein the processing device is configured to determine the stickup height based on the length of an uppermost drill pipe of the drill string and the change in the position of the travelling block.

3. The apparatus of claim 1 wherein the processing device is further configured to output the determined stickup height to a control device for controlling an iron roughneck such that the control device can position the iron roughneck at a height that permits the iron roughneck to perform make up or break out operations.

4. The apparatus of claim 1 wherein the monitoring system further comprises a video camera configured to facilitate a digital image containing an upper end of the drill string or a connection joint of the drill string, and wherein the processing device is further configured to:
  receive the digital image; and
  determine the stickup height of the drill string based on the digital image by:
    recognizing the upper end of the drill string or the connection joint of the drill string on the digital image;
    determining a distance between the upper end of the drill string or the connection joint of the drill string and a rig floor on the digital image; and
    converting the determined distance on the digital image to physical measurements.

5. The apparatus of claim 1 wherein:
the stickup height determined based on the pipe tally and the block position measurements is a first stickup height;
the first stickup height has an error margin that defines a range of the first stickup height;
the monitoring system further comprises a video camera configured to facilitate a digital image containing an upper end of the drill string or a connection joint of the drill string; and
the processing device is further configured to:
  receive the digital image;
  determine a second stickup height based on the digital image; and
  when the second stickup height is outside the range of the first stickup height, disregard the second stickup height.

6. The apparatus of claim 1 wherein the stickup height determined based on the pipe tally and the block position measurements has an error margin that defines a range of the stickup height, wherein the monitoring system further comprises a video camera configured to facilitate a digital image containing an upper end of the drill string or a connection joint of the drill string, and wherein the processing device is further configured to:
  receive the digital image;
  recognize the upper end of the drill string or the connection joint of the drill string on the digital image; and
  when the processing device does not recognize the upper end of the drill string or the connection joint of the drill string on the digital image within the range of the stickup height, output a signal to a human drill rig operator to indicate to the human drill rig operator to manually adjust position of the iron roughneck to the height that permits the iron roughneck to perform make up or break out operations.

7. The apparatus of claim 1 wherein the monitoring system further comprises a video camera configured to facilitate a digital image containing an upper end of the drill string or a connection joint of the drill string, and wherein the processing device is further configured to:
  receive the digital image;
  recognize the upper end of the drill sting or the connection joint of the drill string on the digital image by comparing the digital image to a database comprising a plurality of images labeled with features of the upper ends of other drill strings and features of the connection joints of other drill strings; and
  determine the stickup height based at least in part on location of the upper end of the drill string or the connection joint of the drill string on the digital image.

8. The apparatus of claim 7 wherein the processing device is further configured to:
  recognize the upper end of the drill string or the connection joint of the drill string on the digital image with a confidence level; and
  when the confidence level is below a predetermined confidence threshold:
  receive from a human drill rig operator a confirmation that the digital image contains the upper end of the drill string or the connection joint of the drill string; and
  record the digital image labeled with features of the upper end of the drill string or features of the connection joint of the drill string to the database.

9. The apparatus of claim 1 wherein:
the monitoring system further comprises:
  a first video camera configured to facilitate a first digital image containing an upper end of the drill string or a connection joint of the drill string; and
  a second video camera configured to facilitate a second digital image containing the upper end of the drill string or the connection joint of the drill string; and
the processing device is further configured to:
  receive the first digital image and the second digital image;
  recognize the upper end of the drill string or the connection joint of the drill string on the first digital image with a first confidence level;
  recognize the upper end of the drill string or the connection joint of the drill string on the second digital image with a second confidence level;
  determine the stickup height based on one of the first digital image and the second digital image that is associated with a greater one of the first confidence level and the second confidence level; and
  output the determined stickup height to a control device for controlling an iron roughneck such that the control device can position the iron roughneck at a height that permits the iron roughneck to perform make up or break out operations.

10. The apparatus of claim 1 wherein:
the monitoring system further comprises a video camera configured to facilitate a digital image containing an upper end of the drill string or a connection joint of the drill string;
the processing device is further configured to:
  receive the digital image; and
  determine the stickup height based on the digital image; and
  the drill rig comprises a cleaning device disposed below the rig floor such that the cleaning device cleans the drill string while the hoisting system moves the drill string.

11. An apparatus comprising:
a monitoring system for determining a stickup height of a drill string for drilling a wellbore, wherein the drill string comprises a plurality of drill pipes assembled via equipment of a drill rig, and wherein the monitoring system comprises:
  a video camera configured to facilitate a digital image containing an upper end of the drill string or a connection joint of the drill string; and
  a processing device comprising a processor and a memory storing a computer program code, wherein the processing device is configured to:
    receive the digital image;
    recognize the upper end of the drill string or the connection joint of the drill string on the digital image based on other images containing upper ends of other drill strings and connection joints of other drill strings recorded in an image database; and determine the stickup height based at least in part on location of the upper end of the drill string or the connection joint of the drill string on the digital image, wherein the stickup height determined based on the digital image is a first stickup height, wherein the monitoring system further comprises a block position sensor configured to facilitate block position measurements indicative of a position of a travelling block of a hoisting system, and wherein the processing device is further configured to:

record a pipe tally indicative of a length of each drill pipe of the drill string and a location of each drill pipe within the drill string;

receive the block position measurements while the hoisting system moves the drill string; and determine a second stickup height based on the pipe tally and the block position measurements.

12. The apparatus of claim 11 wherein the processing device is configured to determine the stickup height based at least in part on the location of the upper end of the drill string or the connection joint of the drill string on the digital image by:

determining distance between the upper end of the drill string or the connection joint of the drill string and a rig floor on the digital image; and converting the determined distance to physical measurements.

13. The apparatus of claim 11 wherein the processing device is further configured to:

recognize the upper end of the drill string or the connection joint of the drill string on the digital image with a confidence level; and when the confidence level is below a predetermined confidence threshold:

receive from a human drill rig operator a confirmation that the digital image contains the upper end of the drill string or the connection joint of the drill string; and record the digital image to an image database.

14. The apparatus of claim 11 wherein the second stickup height has an error margin that defines a range of the second stickup height, and wherein the processing device is further configured to, when the first stickup height is outside the range of the second stickup height, disregard the first stickup height.

15. The apparatus of claim 11 wherein the second stickup height has an error margin that defines a range of the second stickup height, and wherein the processing device is further configured to, when the processing device does not recognize the upper end of the drill string or the connection joint of the drill string on the digital image within the range of the second stickup height, output a signal to a human drill rig operator to indicate to the human drill rig operator to manually adjust position of the iron roughneck to the height that permits the iron roughneck to perform make up or break out operations.

16. The apparatus of claim 11 wherein the drill rig comprises a cleaning device disposed below the rig floor such that the cleaning device cleans the drill string while a hoisting system moves the drill string.

17. An apparatus comprising:

a monitoring system for determining a stickup height of a drill string for drilling a wellbore, wherein the drill string comprises a plurality of drill pipes assembled via equipment of a drill rig, and wherein the monitoring system comprises:

a plurality of video cameras each configured to facilitate a digital image containing an upper end of the drill string or a connection joint of the drill string; and a processing device comprising a processor and a memory storing a computer program code, wherein the processing device is configured to:

receive the digital images facilitated by the cameras;

recognize the upper end of the drill string or the connection joint of the drill string on each digital image;

determine a confidence level of recognition of the upper end of the drill string or the connection joint of the drill string for each digital image;

determine the stickup height based on one or more of the digital images associated with a highest confidence level of recognition; and output the determined stickup height to a control device for controlling an iron roughneck such that the control device can position the iron roughneck at a height that permits the iron roughneck to perform make up or break out operations.

18. The apparatus of claim 17 wherein the processing device is configured to determine the stickup height by:

determining a distance between the upper end of the drill string or the connection joint of the drill string and a rig floor on the one or more of the digital images associated with the highest confidence level of recognition; and converting the determined distance to physical measurements.

19. The apparatus of claim 17 wherein the processing device is further configured to:

recognize the upper end of the drill string or the connection joint of the drill string on each digital image by comparing each digital image to a database comprising a plurality of images labeled with features of the upper ends of other drill strings and features of the connection joints of other drill strings; and determine the stickup height based at least in part on location of the upper end of the drill string or the connection joint of the drill string on the one or more of the digital images associated with the highest confidence level of recognition.

* * * * *